United States Patent

[11] 3,572,732

[72] Inventor Stephen A. Sekulich
  Brighton, Mich.
[21] Appl. No. 802,586
[22] Filed Feb. 26, 1969
[45] Patented Mar. 30, 1971
[73] Assignee The Mather Company
  Toledo, Ohio

[54] DOUBLE LOAD AREA LIP SEAL
  18 Claims, 5 Drawing Figs.
[52] U.S. Cl. .................................................. 277/153,
  277/181
[51] Int. Cl. ..................................................... F16j 15/32
[50] Field of Search ........................................... 277/26,
  153, 181—184

[56] References Cited
  UNITED STATES PATENTS
  3,084,944 4/1963 Stucke .......................... 277/26
  OTHER REFERENCES
  The Journal of Teflon Vol. 6 No. 7 Wilm. Del. Sept.-Oct. 1965 pg. 1— 8 incl Primary Examiner—Laverne D. Geiger
Assistant Examiner—Robert I. Smith
Attorney—Hugh Adam Kirk ABSTRACT: A polytetrafluoroethylene elastomeric seal between two relatively movable parallel surfaces, such as for a shaft through a housing, which seal has a substantially uniform bent L-shaped transverse or radial cross section in which the top portion of the vertical leg of the L is fixed substantially perpendicularly to one of the parallel surfaces, such as by a press fit ring in the housing around the shaft, and the lower portion of the vertical leg of the L is bent so as to rest in parallel sliding contact with the other surface and the normally horizontal leg of the L extends substantially perpendicular to this other surface. The thus positioned seal forms a reverse J-shaped cross section bridging the space between the two parallel surfaces. That portion of the lower part of the normally vertical L which has sliding contact with the other surface, seals said surface both statically and dynamically, and is of sufficient width to provide two spaced increased or higher load areas, one adjacent the sharp angle portion of the horizontal leg of the L, and the other adjacent the bend in the vertical leg of the L. In the hook of this J-shaped cross section there may be located a garter spring to insure these two separate higher load areas at the two side edges of the wide contact area of this lip seal. Said other higher load area may also comprise a sharp ridge formed in the outer surface of the L-shaped leg, and/or have adjacent pumping vanes; and the inner surface opposite this ridge may also be provided with a ridge for better seating or pocketing the garter spring. Furthermore, a dust seal may be spaced outside of said other higher load area and attached to the means which anchors the upper portion of the L-shaped leg of the seal or to its housing.

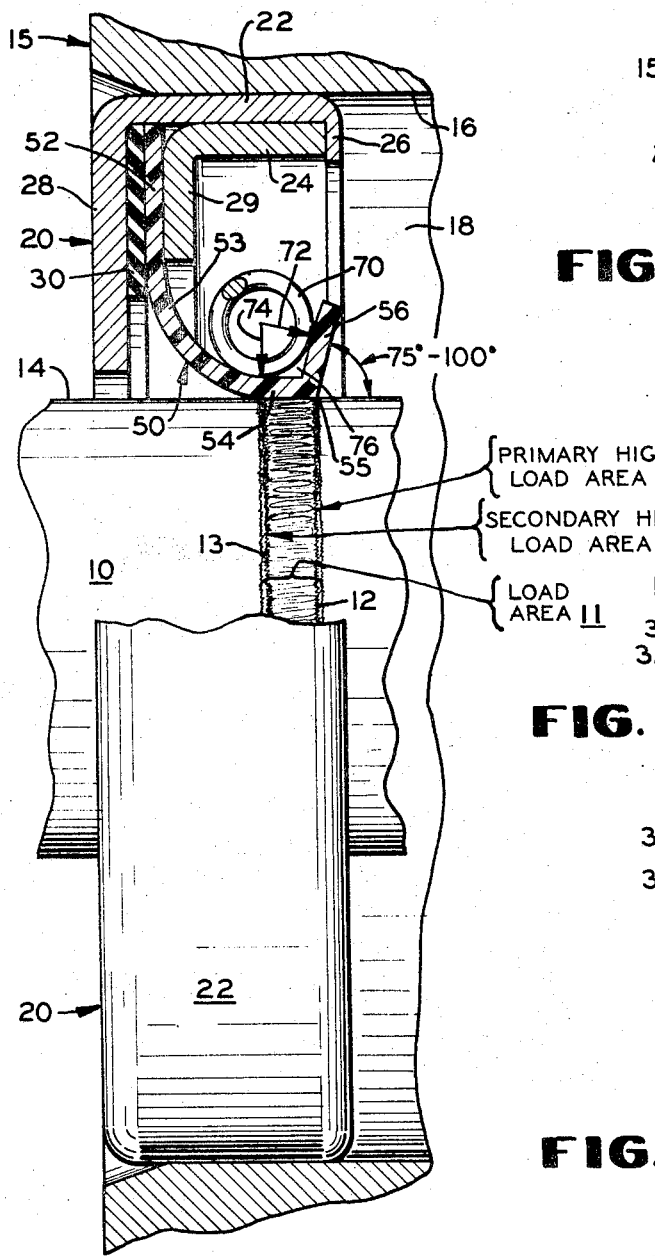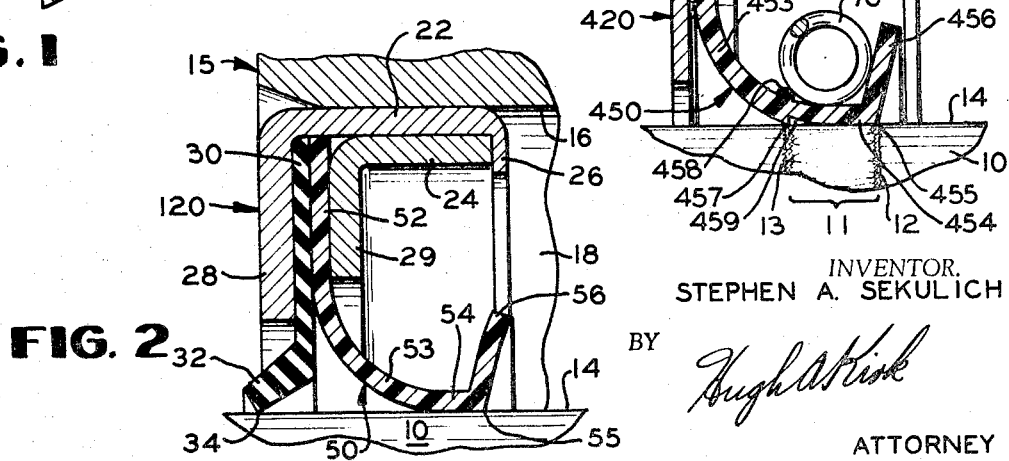

DOUBLE LOAD AREA LIP SEAL

BACKGROUND OF THE INVENTION

Previously few polytetrafluoroethylene elastomeric seal performed well enough, because tetrafluroroethylene behaves different from rubber or other plastic materials. Therefore, one must consider he load, heat, shape, eccentricity, amount of oil in the seal area, and many other factors to provide a satisfactory seal. Dynamic sealing with such polytetrafluoroethylene elastomers also was difficult because such elastomers have a tendency to deform and creep under load and are very susceptible to a high rate of thermal expansion and stiffness, so that its area of sliding contact in forming the seal was difficult to maintain constant. Also, if the seal did not have a sharp edge and load area of contact with the shaft and/or had a large wide area of contact, there was the chance of the turbulent oil on one side of the seal forming a wedge under the seal causing leakage or bell-mouthing. Furthermore the composition of the tetrafluoroethylene was hard to control.

As a result of these many factors, it was difficult to mass produce such tetrafluorethylene elastomeric seals.

SUMMARY OF THE INVENTION

Generally speaking the present invention comprises a static and dynamic polytetrafluoroethylene elastomeric barrier or lip seal between two spaced relatively movable surfaces, such as a rotatable shafts in its housing, which prevents fluid media from leaking into the atmosphere an reduces or eliminates the above mentioned difficulties of previously known similar seals. This is accomplished by carefully controlling the composition of the tetrafluoroethylene elastomer employed in the lip seal and controlling its parameters for each particular type job it is to perform, depending upon the size of the opening which is to be sealed and the speed of movement between the spaced parallel surfaces which form the opening. This does not mean, however, that similar units cannot be mass produced, because the seals of this invention have easily reproducible uniform and simple cross section, namely that of an L which may be preformed, molded, or coined and then bent into a reverse J-shaped cross section when in its used or preinstalled position.

That portion of the seal which is to be fixed to one of the two parallel surfaces may be plastically mounted or bonded directly to a support, ring, or housing; or it may be pressed against a gasket between a pair of telescopic cups which are machined to fit snugly into the aperture in a housing around a shaft.

The other or sliding contacting portion of the seal is bent so that the lower portion of the vertical leg of its L-shaped transverse or radial cross section will contact a substantially wide area of sliding contact with the other parallel surface. This contact area must be wide enough to provide two spaced parallel higher load areas along its sides, which higher load areas have a different pressure pattern against the sliding surface than the remaining intermediate contact area between them. When this L-shaped cross section is thus formed or bent, its normally horizontal leg is substantially perpendicular to this sliding contact surface, namely at an angle between about 75° and 100° therewith.

Between the now upstanding or normally horizontal leg of the L-shaped cross section and the bent portion of the vertical leg portion of the L there is provided a trough, seat, or pocket into which there may be placed a garter spring if the seal is to surround a rod member or rotating shaft. This garter spring is so tensioned and sized to fit into this pocket and push both radially inwardly and axially outwardly on the lower now upstanding leg of the L to provide a sharp primary higher load area at the angle of this L with the shaft. This is accomplished by having a component of force bearing against this outer section tending to open the angle of the L which in effect presses its outer angle edge against the shaft or the sliding surface.

The other radial or normal force supplied by the garter spring to the sliding surface or shaft forms the other secondary higher load area on the surface spaced away from the angle edge of the L. This secondary higher load area may be accentuated by a ridge formed in the outer vertical leg of the L-shaped cross section, or by a separate parallel uniformly thick sheet of polytetrafluoroethylene along the outside of the vertical leg portion of the L and bends and ends at this secondary higher load area.

Adjacent this secondary higher load area long the outside of the bent portion of the vertical leg portion of the L-shaped cross section there may be provided a plurality of parallel helical vanes molded or coined therein to act as a pump to further prevent the escape of any oil or other fluid which might pass through the contact areas of the seal. The direction of these vanes corresponds with the direction of rotation of the shaft, however, for a reversible shaft, vanes in both directions may be provided. These vanes cause the secondary higher load area to act as the dynamic seal, while the primary higher load area acts as the static seal, while in other embodiments both load areas act as static and dynamic seals.

When the lip seal of this invention is used to seal a shaft or against another surface, it is preferable that the inside diameter of the pre-formed or straight L-shaped position is between about 0.100 and 0.350 thousandths of an inch larger than the space to be sealed or smaller than the outside diameter of the shaft, and it is desirable that the sliding surface or the shaft to be sealed is very smooth or polished so as to reduce wear as much as possible on the contacting surface of the lip seal.

OBJECTS AND ADVANTAGES

Thus it is an object of this invention to produce a simple, efficient, effective, inexpensive, easy to install, low coefficient of friction, and highly resistant to wear lip type seal of polytetrafluoroethylene which performs effective both at high and low temperatures ranging between about − 400° and + 500° F. and at speeds from 0 up to over 15,000 r.p.m.

Another object is to produce such a sea which provides two separate defined load areas for both static and dynamic sealing without producing any bell-mouthing or changing its contact pattern, and also is sufficiently flexible to permit a certain amount of runout or eccentricity between the shaft itself and its inner periphery without fatigue and breakage of the seal.

A further object is to produce such a seal which is resistant to most chemicals and to all known commercial lubricants, and is made of such parameters that it will allow creep and thermo expansion without leakage.

BRIEF DESCRIPTION OF THE DRAWINGS

The above mentioned and other features, objects and advantages and the manner of attaining them are described more specifically below by reference to embodiments of this invention shown in the accompanying drawings, wherein:

FIG. 1 is an enlarged partial radial cross section of one embodiment of the tetrafluoroethylene elastomeric seal of this invention in combination with a shaft and a metal housing and having a garter spring, and showing its contact pattern with two separate higher load areas on the shaft;

FIG. 2 is an enlarged partial radial cross section of another embodiment of the seal shown in FIG. 1 without a garter spring and with a dust seal incorporate therewith supported in its housing;

FIG. 3 is another embodiment of the seal similar to that shown in FIG. 1 before it is installed on a shaft having an integrally formed plastic housing and helical pumping vanes adjacent its dynamic seal higher load contact area;

FIG. 4 is a similar partial radial cross-sectional view of another embodiment of the seal of this invention similar to FIG. 1 but showing a separate uniform tetrafluoroethylene elastomeric annulus to form the secondary higher load area; and FIG. 5 is a further embodiment similar to FIG. 4 showing two opposite integral ribs in the bent portion of the elastomeric seal, an inner rib for positioning the garter spring and a sharp outer rib for providing the secondary higher load area.

DETAILED DESCRIPTION OF THE PREFERRED EMBODIMENTS

FIG. 1 2, 4 and 5 disclose relatively movable parts 10 an 15 having parallel surfaces 14 and 16, respectively, which are uniformly separated by a space or cavity 18 which is bridged by one of the embodiments of the seal assemblies 20, 120, 220, 320 or 420 of this invention. In the particular instances shown, part 15 comprises a housing and the part 1 is a shaft, however, these may be reversed. It is important for the best performance and the longest life of the seal of this invention, that at least the sliding contacting surface 14 of the part 10 be as smooth as possible, and preferably free from scratches, pits, helical grooves, and etchings.

According to the disclosure shown, the seal assemblies 20, 120, 220, 320 and 420, are assembled so that the fluid to be sealed is usually on the right side thereof and the atmosphere is on the left. Thus the right side would be the oil side if these seals were provided for a lubricated shaft in a bearing, which bearing would be to the right of the seals shown.

I The Housing

In FIGS. 1, 2, 4 and 5 the housing or anchoring means for the elastomeric tetrafluoroethylene sealing member 50, 350 and 450 respectively comprises a pair of telescoping cups or rings, namely an outer cup 22 into which an inner cup 24 telescopes. The outer edge 26 of the outer cup 22 may be spun over to hold the inner cup in position. Thus the upper part of the vertical leg of the L-shaped polytetrafluoroethylene elastomeric seal member 50, 350, or 450 is tightly clamped between the bottom cup portions or radial flanges 28 and 29. If required a rubber or plastic gasket member 30 may also be pinched between these two flanges 28 and 29, which in FIG. 2 may also include a inwardly extending flange 32 which contacts the movable surface 14 of the member 10 and provides a lip dust type seal at the point 34 shown in FIG. 2. Together with the gasket 30 or in place thereof, there may be added a bonding or sealing agent 36 as shown in FIGS. 4 and 5 to prevent leakage. It is to be understood that the dust seal 32 and the bonding agent 36 may be provided in any of the embodiments disclosed without departing from the scope of this invention.

In the embodiment shown in FIG. 3, a different type of unitary plastic housing 222 is disclosed which is bonded directly to the upper end of the vertical leg portion of the L-shaped cross-sectional (see applicant's copending joint Ser. No. 560,661 filed Jun. 27, 1966, (now U.S. Pat. No. 3,443,845 issued May 13, 1969) seal 50, thereby eliminating the requirement of the metal cups for clamping the seal shown in the other figures. This plastic housing or support member 222 has an inner tapered surface 224 which makes it easily insertable into the solid member 15, and since this member 222 is made of plastic, the inside tolerance required for the surface 16 of the member 15 need not be critical as for the outer metal cup 22 shown in the other embodiments. If desired, the plastic housing member 222 may be employed instead of the telescopic metal cup 22 and 24 shown in FIGS. 1, 2, 4 or 5, and similarly these metal cups 22 and 24 may be employed instead of the plastic member 222 shown in FIG. 3, without departing from the scope of this invention.

II the Elastomeric Seal

When the polytetrafluoroethylene elastomeric seals of this invention are produce they all first have a substantial L-shaped transverse or radial cross section with a relatively long vertical leg and a sharp right-angled shorter horizontal leg. This cross section is substantially uniform in thickness and shape throughout the length of the seal. When these seals are formed for use the vertical leg of the L-shaped cross section is bent to from a reversed J-shaped cross section as shown in each of the figures of the drawings.

If this seal is for a rotating shaft 10, it would be in the form of an annulus as seals 50, 250, 350, and 450 shown in the drawings, with inwardly radially extending flange portions 52, 252, 352 and 452 of the upper portions of the vertical legs of their L- or J-shapes. The lower portions 54, 254, 354 and 454 of of vertical legs are then bent and formed over a mandrel which may be heated if necessary, to be at substantially right angles to these radially outwardly extending portions and to extend parallel and in contact with the shafts 10. Thus the parameters of the annuli of tetrafluoroethylene elastomers must be such so that smooth uniform radius arced and bent intermediate portions 53, 253 and 453 join the ends of these other portions of the vertical legs of the L or J. These bent portions also must be sufficiently flexible and elastic to provide a substantially uniform and continuous contact of the lower portions 54, 254, 354 and 454 with the surfaces 14, even though there is some runout or eccentricity between the shafts 10 and the housings of the seal assemblies. The other lower or horizontal legs 56, 256, 356 and 456 of the bent L or reversed J-shaped cross sections now extend substantially radially outwardly from the surfaces 14 forming an included angle of between about 75° and 100° therewith.

The outer edges 55, 255, 355 and 455 of the right angles in the cross section of these seals should be smooth and sharp and before installation be as much as about 0.200 inches smaller in diameter than the outer diameter of the shafts 10 as shown in FIG. 2, so as to insure the proper and wide contact area 11, shown in FIG. 1 on the shaft 10, for the lower portions 54, 254, 354 and 454 which forms the sliding part of the seals of this invention. If this inner diameter of the outer edges 55 255, 355 and 455 is substantially the same as the outer diameter of the shaft, for easier installation, heat may be applied to the seal to cause it to reform and load the shaft after its installation, which heat may be supplied either from the shaft itself by friction or a separate heat source. This contact area 11 is sufficiently wide and the tetrafluoroethylene elastomeric seals 50, 250, 350 an 450 are so formed that two higher load areas are produced at the edges of the area 11, namely, a primary higher load area 12 adjacent the angle edges 55, 255, 355 and 455, and a separate secondary higher load area 13 adjacent the start of the bent portions 53, 253, 353 and 453 (see FIG. 1). This wide contact are 11 with its two higher load areas 12 and 13 is also insured by the elastomeric properties of the tetrafluoroethylene seals 50, 250, 350 and 450 and their bent portions 53, 253, 353 and 453, which elastic properties increase with increase in temperature including that caused by any friction in the contact area 11. Also these higher load contact areas 12 and 13 may be insured further by the aid of a garter spring 70 described in the following Section III.

Thus, it is important that the contact area 11 be uniform and that the load across all of it be sufficient that only a very thin film of oil or lubricant is allowed to form between the lower portions 54, 254, 354 and 454 and the shafts 10. I he parameters and/or composition of the elastomeric seals 50, 250, 350 and 450 were not proper, and/or composition of the elastomeric seals 50, 250, 350 and 450 were not proper, and/or the garter spring 70 was not correct, the primary higher load area 12 could lift away from the surface 14 providing a turbulent wedge of oil or other liquid on the right side of the seal to cause bell-mouthing and leakage of the liquid to the other or left side of the seal. Thus it is important that the higher load area 12 is provided so that during both static and dynamic operations, that no more than the required thin film of oil is allowed to accumulate over the area 11, and that there is also an additional or secondary higher load area 13 to prevent this thin film of liquid which does accumulate in the area 11 from passing out into the atmosphere at the left side of the seals.

In the embodiment disclosed in FIG. 3, there is provide a plurality of helically coined vanes or ridges 257 in the outer curved or bent surface of the portion 253 of the elastomeric seal 250, which vanes 257 end at the edge 258 of the secondary higher load area 13 when placed on its contacting surface. These vanes are provided to pump any oil or liquid which may leak out from under the seal in its contact area 11 back under this seal area and prevent is escape into the atmosphere. If the shaft rotates in the opposite direction, then the vane 257 would angle helically in the opposite direction than shown in FIG. 2, and if the shaft rotates alternately in either direction, both angling vanes formed as sides of triangles with their apices at the edge 258 may be provided. Such vanes 257 may be coined in any of the other seals shown without departing from the scope of this invention.

In the embodiments shown in FIGS. 4 and 5, there are provided separated edges 367 and 457 for defining the separate secondary higher load areas 13. In FIG. 4 this load area 13 is provided by a separate parallel radial tetrafluoroethylene strip 360 whose outer radial portion 362 is coupled with the portion 352 between the cup flanges 28 and 29, and whose inner portion 363 surrounds the bent portion 353 so that only its inner end 364 has its lower or inner edge 367 forming the high load area 13 while the outer edge of its inner end forms a hump 358 on the inside of the J-shaped cross section to provide a seat for a garter spring 70.

In FIG. 5 this separate edge 457 is formed integral in the bent vertical leg portion 453 of the tetrafluoroethylene seal 450 by providing a groove or notch 459 therein to form the edge 457 for the dynamic load seal area 13. Opposite this notch 459 there is also provided a ridge 458 as a seat for the garter spring 70.

III The Garter Spring

Optionally and in order to insure further the two higher load areas 12 and 13 at the edges of the contact area 11, there may be provided in the hook portion of the J-shaped cross section of the polytetrafluoroethylene elastomeric seals 50, 250, 350 and 450, a garter spring 70 which is of such a size and strength to fit into this hook or annular groove portion and provide two forces, one indicated by the arrow 72 in FIG. 1 and directed about parallel to the axis or the shaft 10, and the other indicated by the arrow 74 directed perpendicular to the surface 14 of or radial to the shaft 10. The force of arrow 72 is directed against the inside of the shorter L leg portion 56 to insure that the edge 55 forms a very sharp primary higher load area 12 at one edge of the wide contact area 11. The fore of the arrow 74 is at the other edge of the wide contact area 11, and forms the increased or secondary higher load area 13 adjacent the start of the bent portion 53. In order to provide these two separate forces 72 and 74, and two separate an defined higher load areas 12 and 13, it is important that there are only two points of contact of the helical garter spring 70 with the inside of the hook or angle of the reverse J-shaped cross section of the seals to form a substantially triangular space 76 therebetween. Similarly the garter spring 70 shown in FIGS. 3, 4 and 5 provides forces to insure the two spaced load areas 12 and 13. If desired, there also may be provided a garter spring in the embodiment shown in FIG. 2 without departing from the scope of this invention.

The hump 358 in FIG. 4 and ridge 458 in FIG. 5 aid in providing a better seat or pocket for the garter spring 70 to insure the proper location for the forces 72 and 74. Similarly a garter spring 70 may be omitted as in FIG. 2, from any one of the other embodiments without departing from the scope of this invention.

The necessity of such a spring 70 and its strength depends upon the particular type of sealing job to be done, the relative speed between the surfaces 1 and 16, width of the space 18, and composition and parameters or dimensions of the polytetrafluoroethylene elastomeric member 50, 250, 350 or 450.

Thus in order to obtain the advantages and the two different load areas 12 and 13 at the edges of a wide contact area 11 for the slide of the seal members 50, 250, 350 and 450, the parameters and composition of the tetrafluoroethylene elastomer must be accurately controlled and made to correspond with the particular use for which is is intended.

I claim:

1. A seal between parts having parallel surfaces moving relative to each other at substantially the same spacing, said seal comprising:
   a. a substantially uniformly thick elastic polytetrafluoroethylene barrier across the space between the parts, and having
      a. a cross-sectional area substantially in the shape of a "J" with a sharp angular outer edge near the end of its hook portion, and in which the vertical leg to said edge is longer than the perpendicular distance between the parallel surfaces;
      b. the bottom portion of said J rests on one of said surfaces so that the end of said hook portion of said J is substantially perpendicular to and extending away from said one surface; and
      c. a sufficient portion of the outside of said bottom portion of said J contacts said one surface to produce two spaced parallel load areas at its edges;
         1. one load area being a relatively sharp load area at the angle of said hook portion of said J; and
         2. the other load area being adjacent and near the lower end of the vertical leg of said J; and
   B. means for anchoring the upper portion of said vertical leg of said J to the other of said surfaces to move therewith and prevent any leakage between said barrier and said surface.

2. A seal according to claim 1 wherein said parts comprise a housing and a shaft, and wherein said barrier comprises an annulus.

3. A seal according to claim 1 wherein the upper portion of aid vertical leg of said J is substantially perpendicular to one of said surfaces.

4. A seal according to claim 1 including a garter the inside in the hook portion of said J to aid the formation of the two spaced load areas.

5. A seal according to claim 4 including a ridge on inside of the hook portion of said J to further seat said garter spring.

6. A seal according to claim 1 wherein helical vanes are provided in the surface of said barrier adjacent said other load area and away from said one ad area.

7. A seal according to claim 1 wherein said means for anchoring the upper portion of said vertical leg of said J comprises a pair of telescopic annular cup members between which said upper end of said vertical leg of said J is clamped.

8. A seal according to claim 7 including a gasket between said cup members with said upper end of the vertical leg of said J.

9. A seal a according to claim 1 wherein aid means or anchoring said upper end of the vertical leg of said J includes a plastic directly bonded to said upper end of said vertical leg of said J.

10. a seal according to claim 1 wherein said means for anchoring the upper portion of the vertical leg of said J also includes means for anchoring a resilient dust seal which contacts said upper portion of said J and is spaced from said other load area away from said one load area.

11. A static dynamic lip seal for a smooth shaft comprising;
   A. a annular housing spaced around the shaft;
   B. a polytetrafluoroethylene elastomeric annulus of substantially uniform thickness having a bent L-shaped radial cross section with
      a. the upper end of the longer leg of the L attached to said housing,
      b. the lower end of the longer leg of the L being bent for contacting the cylindrical surface of said shaft, and c. the normal shorter leg portion of the L forming a sharp angle substantially perpendicular to the surface of the shaft, to produce two parallel spaced load areas adjacent the edges of the area of contact with the cylindrical surface of the shaft by the lower portion of the longer leg of the L, one of which load areas is under the angle of the L and the other of said load areas is adjacent the bent portion of the L.

12. A lip seal according to claim 11 including garter spring in the trough formed by the bent-up horizontal end portion of the L and the bent portion of the L to aid the formation of said load areas.

13. A lip seal according to claim 11 including helical vanes in the outside bent curved portion of the L adjacent said other load area.

14. A static and dynamic lip seal for a smooth shaft comprising:
A. an annular housing spaced around the shaft,
B. an elastic tetrafluoroethylene annulus of substantially uniform thickness and of a J shaped radial cross section with
 a. the outer portion of the vertical leg of said J extending radially of the shaft and being fixed to said housing,
 b. the bottom of the hook portion of said J extending axially of and in contact with the periphery of the shaft along a shaft along a cylindrical area of the shaft, and
 c. the outer end of said hook portion extending radially outwardly from the shaft at a sharp angle substantially perpendicular to the surface of the shaft, and
C. a garter spring located in said hook portion to form a primary cylindrical load area at said angle edge of said annulus, and a secondary parallel spaced cylindrical load area near the vertical leg portion of said J.

15. A lip seal according to claim 14 wherein said housing comprises a plastic molded housing.

16. A lip seal according to claim 14 wherein said housing comprises a pair of telescopic rings of L-shaped radial cross section clamping the said outer portion of the longer leg of said tetrafluoroethylene annulus.

17. A seal according to claim 16 including a gasket clamped between said rings with said annulus.

18. A lip seal according to claim 14 including a radial dust seal of rubber attached to said housing and contacting the shaft.

PO-1050
(5/69)

UNITED STATES PATENT OFFICE
CERTIFICATE OF CORRECTION

Patent No. 3,572,732                                   Dated Mar. 30, 1971

Inventor(s)   Stephen A. SEKULICH

It is certified that error appears in the above-identified patent and that said Letters Patent are hereby corrected as shown below:

Column 1, line 5, "seal" should read -- seals --; line 30, " should read -- shaft --; line 31, "an" should read -- and --; line "section" should read -- sections -- . Column 2, line 2, after "( insert -- or --; line 11, "long" should read -- along --; line "effective" should read -- effectively -- ; line 65, "incorporate" should read -- incorporated -- . Column 3, line 8, "Fig. 1" she read -- Figs. 1, -- ; line 14, "1" should read -- 10 -- , line "50" should read -- 250 -- ; line 61, "the" should read -- this line 63, "cup" should read -- cups -- ; line 68, "the" should re -- The -- ; line 71, "produce" should read -- produced -- ; Column 4, line 9, "of" (second occurrence) should read -- these - line 16, after "253" insert -- , 353 -- ; line 36, after "55" inse a comma -- , -- ; line 42, "an" should read -- and -- ; line 4 "are" should read -- area -- ; line 59, "I he" should read -- If the -- ; line 62, after "proper," delete -- and/or composi of the -- ; line 63, delete this whole line beginning with -- elastom ...........proper, -- ; line 70, "no" should read -- not -- . Column 5, line 11, "provide" should read -- provided -- ; line 11, "2" should read -- 3 -- ; line 49, "fore" should read -- force  line 72, "1" should read -- 14 -- . Column 6, line 2, "wide" should read -- wider -- ; line 11, "a." should read -- A. -- ; line 42, "the inside" should read -- spring -- ; line 45, after "o insert -- the -- ; line 49, "ad" should read -- load -- ; line 5' delete "a" ; "aid" should read -- said -- ; "or" should read -- fo line 68, "a" should read -- an -- . Column 7, line 9, after "including" insert -- a -- . Column 8, line 3, delete the phrase -- along a shaft -- .

Signed and sealed this 14th day of September 1971.

(SEAL)
Attest:

EDWARD M. FLETCHER, JR.
Attesting Officer

ROBERT GOTTSCHALK
Acting Commissioner of Pate